(12) United States Patent
Kim et al.

(10) Patent No.: US 11,413,929 B2
(45) Date of Patent: *Aug. 16, 2022

(54) THERMAL MANAGEMENT FOR VEHICLE

(71) Applicants: Hyundai Motor Company, Seoul (KR); Kia Motors Corporation, Seoul (KR)

(72) Inventors: Jae Yeon Kim, Hwaseong-si (KR); Yeonho Kim, Seoul (KR); Jeawan Kim, Gwangmyeong-si (KR); Wan Je Cho, Hwaseong-si (KR)

(73) Assignees: Hyundai Motor Comapny, Seoul (KR); Kia Motors Corporation, Seoul (KR)

(*) Notice: Subject to any disclaimer, the term of this patent is extended or adjusted under 35 U.S.C. 154(b) by 48 days.

This patent is subject to a terminal disclaimer.

(21) Appl. No.: 17/113,002

(22) Filed: Dec. 5, 2020

(65) Prior Publication Data

US 2021/0402844 A1    Dec. 30, 2021

(30) Foreign Application Priority Data

Jun. 30, 2020  (KR) .................... 10-2020-0079936

(51) Int. Cl.
*F25D 23/12*   (2006.01)
*B60H 1/00*    (2006.01)
(Continued)

(52) U.S. Cl.
CPC ..... *B60H 1/00278* (2013.01); *B60H 1/00392* (2013.01); *B60H 1/00485* (2013.01);
(Continued)

(58) Field of Classification Search
CPC .......... B60H 1/00278; B60H 1/00392; B60H 1/00485; B60H 1/03; B60H 1/3227; B60H 2001/00307
(Continued)

(56) References Cited

U.S. PATENT DOCUMENTS 8,215,432 B2   7/2012  Nemesh et al.
8,899,062 B2  12/2014  Kadle et al.
(Continued)

FOREIGN PATENT DOCUMENTS

JP         5336033 B2   11/2013
WO   WO 20120012760 A   8/2012

*Primary Examiner* — Davis D Hwu
(74) *Attorney, Agent, or Firm* — Morgan, Lewis & Bockius LLP

(57) ABSTRACT

A thermal management system may include: a cooling apparatus of circulating a coolant in a coolant line to cool at least one electrical component provided in the coolant line; a battery cooling apparatus of circulating the coolant to the battery module; a chiller for heat-exchanging the coolant with a refrigerant to control a temperature of the coolant; a heater that heats an interior of the vehicle using the coolant; a branch line; a chiller connection line connecting the chiller and the valve; and wherein the reservoir tank is provided in the coolant line between the radiator and the valve, and is connected to the coolant line connecting the valve and the first water pump through a supply line, and wherein a condenser included in the air conditioner is connected to the coolant line to pass the coolant circulating through the cooling apparatus.

20 Claims, 7 Drawing Sheets

(51) Int. Cl.
  *B60H 1/03* (2006.01)
  *B60H 1/32* (2006.01)
(52) U.S. Cl.
  CPC ............ *B60H 1/03* (2013.01); *B60H 1/3227* (2013.01); *B60H 2001/00307* (2013.01)
(58) Field of Classification Search
  USPC ...................................................... 62/259.2
  See application file for complete search history.

(56) References Cited

U.S. PATENT DOCUMENTS

| | | |
|---|---|---|
| 9,109,840 B2 | 8/2015 | Kadle et al. |
| 9,239,193 B2 | 1/2016 | Kadle et al. |
| 2013/0283838 A1 | 10/2013 | Kadle et al. |
| 2015/0258875 A1* | 9/2015 | Enomoto ................ B60L 58/24 165/104.31 |
| 2021/0001686 A1* | 1/2021 | Kim ................... B60H 1/00007 |
| 2021/0188043 A1* | 6/2021 | Smith ................ B60H 1/00385 |
| 2021/0387505 A1* | 12/2021 | Kim .................... B60H 1/3227 |

\* cited by examiner

THERMAL MANAGEMENT FOR VEHICLE

CROSS-REFERENCE TO RELATED APPLICATION

The present application claims priority to Korean Patent Application No. 10-2020-0079936 filed on Jun. 30, 2020, the entire contents of which is incorporated herein for all purposes by this reference.

BACKGROUND OF THE INVENTION

Field of the Invention

The present invention relates to a thermal management system for a vehicle, and more particularly, to a thermal management system for a vehicle which adjusts a temperature of a battery module by use of one chiller that performs heat exchange between a refrigerant and a coolant and improves heating efficiency by use of waste heat generated from an electrical component.

Description of Related Art

In recent years, an electric vehicle has become popular as a future transporting means, as environment and energy resources are becoming important issues. The electric vehicle utilizes a battery module in which a plurality of rechargeable cells is formed as one pack as a main power source, and thus no exhaust gas is generated and noise is very low.

Such an electric vehicle is driven by a drive motor which operates through electric power supplied from the battery module. Furthermore, the electric vehicle includes electrical components for controlling and managing the drive motor as well as a plurality of electronic convenience devices and charging the battery module.

On the other hand, since a large amount of heat is generated in the battery and the electrical components as well as the drive motor used as a primary power source of the electric vehicle, efficient cooling is required, so efficient temperature management of the electrical components and the battery module may be a very important problem.

Conventionally, separate cooling systems are applied to adjust the temperature of the electrical components and the battery module, but it is necessary to increase capacity of the cooling system according thereto, which leads to space restrictions. Furthermore, when the capacity of the cooling systems is increased, power required for operating the cooling systems is also increased.

Accordingly, it is required to develop technologies for efficiently using the waste heat generated from the electrical components, as well as adjusting the temperature of the electrical components and the battery to maximize the energy efficiency while securing the durability of the electrical components and the battery module in the electric vehicle.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a thermal management system for a vehicle, which adjusts a temperature of a battery module by use of one chiller that performs heat exchange between a refrigerant and a coolant and improves heating efficiency by use of waste heat generated from an electrical component.

Various aspects of the present invention are directed to providing a thermal management system for a vehicle, including: a cooling apparatus including a radiator, a first water pump, a valve, and a reservoir tank which are connected through a coolant line, and to circulate a coolant in the coolant line to cool at least one electrical component provided in the coolant line; a battery cooling apparatus including a battery coolant line connected to the coolant line through the valve, and a second water pump and a battery module which are connected to the battery coolant line to circulate the coolant in the battery module; a chiller provided in the battery coolant line between the valve and the battery module, and connected to a refrigerant line of an air conditioner through a refrigerant connection line, to adjust a temperature of the coolant by performing heat exchange between the coolant which is circulated in the battery coolant line and a refrigerant which is selectively supplied from the air conditioner; a heater provided in the coolant line between the electrical component and the radiator to heat a vehicle interior by use of the coolant supplied from the cooling apparatus; a branch line having a first end portion connected to the coolant line between the radiator and the heater, and a second end portion connected to the valve; and a chiller connection line connecting the chiller and the valve separately from the battery coolant line; wherein the reservoir tank is provided in the coolant line between the radiator and the valve, and is connected to the coolant line connecting the valve and the first water pump through a supply line, and wherein a condenser included in the air conditioner is connected to the coolant line to pass the coolant circulating through the cooling apparatus.

The valve may include: a first port connected to the coolant line connected to the reservoir tank; a second port connected to the coolant line connected to the connected to the first water pump; a third port connected to the chiller connection line; a fourth port connected to the branch line; a fifth port connected to the battery coolant line connected to the chiller; and a sixth port connected to the battery coolant line connected to the second water pump.

The valve may be operated to discharge the coolant through a port adjacent to another port into which coolant is introduced among the first port, the second port, the third port, the fourth port, the fifth port and the sixth port.

The air conditioner may include: a heating, ventilation, and air conditioning (HVAC) module including an evaporator which is connected to the refrigerant line and an opening and closing door configured to control an outside air passing through the evaporator to be selectively introduced into the heater depending on a cooling mode, a heating mode, and a heating and dehumidification mode of the vehicle; a condenser provided in the refrigerant line and in the coolant line between the radiator and the heater to circulate a coolant in the condenser to perform heat exchange between the coolant and a refrigerant supplied through the refrigerant line; a compressor connected between the evaporator and the condenser through the refrigerant line; a sub-condenser provided in the refrigerant line between the condenser and the evaporator; a first expansion valve provided in the refrigerant line between the sub-condenser and the evaporator; and a second expansion valve provided in the refrigerant connection line.

The second expansion valve may expand the refrigerant introduced through the refrigerant connection line to flow to the chiller when cooling the battery module by the refrigerant.

A first end portion of the refrigerant connection line may be connected to the refrigerant line between the sub-condenser and the first expansion valve, and a second end portion of the refrigerant connection line may be connected to the refrigerant line between the evaporator and the compressor.

Each of the chiller and the condenser may be a water-cooled heat exchanger, and the sub-condenser may be an air-cooled heat exchanger.

The HVAC module may further include an air heater provided at a side opposite to the evaporator with respect to the heater interposed between the air heater and the evaporator to selectively heat the outside air passing through the heater.

The air heater may be operated to raise a temperature of the outside air passing through the heater when a temperature of a coolant supplied to the heater is lower than a target temperature for internal heating.

When the battery module is cooled in the cooling mode of the vehicle, in the cooling apparatus, the coolant may be circulated in the coolant line by the operation of the first water pump, and the supply line may be opened; the branch line and the chiller connection line may be closed through operation of the valve; the coolant line and the battery coolant line may form independent closed circuits through operation of the valve; in the battery cooling apparatus, the coolant passing through the chiller may be supplied to the battery module along the battery coolant line through operation of the second water pump; in the air conditioner, the refrigerant line connecting the sub-condenser and the evaporator may be opened through operation of the first expansion valve; the refrigerant connection line may be opened through operation of the second expansion valve; and the first and second expansion valves may expand a refrigerant supplied to the refrigerant line and the refrigerant connection line, respectively, and supply the expanded refrigerant to the evaporator and the chiller.

The condenser may condense the refrigerant through heat exchange with the coolant, and the sub-condenser may additionally condense the refrigerant introduced from the condenser through heat exchange with the outside air.

When cooling the electrical component and the battery module by use of the coolant, the branch line may be closed through operation of the valve; the chiller connection line may be opened through operation of the valve, and the supply line may be opened; a portion of the battery coolant line connecting the chiller and the first valve may be closed through operation of the valve; the coolant line connecting the reservoir tank and the valve may be connected to the battery coolant line through operation of the valve; the coolant cooled in the radiator may pass through the battery module along the battery coolant line from the valve through operation of the first and second water pumps; and the coolant passing through the battery module may be introduced from the chiller to the valve along the opened chiller connection line, and then may be supplied to the electrical component while flowing along the coolant line connected to the first water pump.

When using waste heat of the electrical component in the heating mode of the vehicle, the branch line and the chiller connection line may be opened through operation of the valve; in the cooling apparatus, on the basis of the branch line, the coolant line connected to the radiator, the reservoir tank, and the valve may be closed; the supply line may be opened; the battery coolant line except for the battery coolant line connected to the chiller may be closed through operation of the valve; the coolant having a temperature that has risen while passing through the electrical component by the operation of the first water pump may be supplied to the heater along the opened coolant line without passing through the radiator; the coolant discharged from the heater may be introduced into the valve along the opened coolant line and the opened branch line; the coolant introduced into the valve may be again introduced into the valve along the opened chiller connection line after passing through the chiller along the opened portion of the battery coolant line; and the coolant again introduced into the valve may be supplied to the electrical component along the opened the coolant line.

When using waste heat of the electrical component and cooling of the electrical component is required, in a heating mode of the vehicle, the branch line and the chiller connection line may be closed through operation of the valve; in the cooling apparatus, the coolant line may be opened; the supply line may be opened; the battery cooling apparatus may be deactivated; the coolant having a temperature that has risen while passing through the electrical component by the operation of the first water pump may be supplied to the heater along the coolant line; and the coolant discharged from the heater may be cooled while passing through the radiator along the coolant line through operation of the first water pump, and then may recover waste heat from the electrical component while passing through the electrical component and cools the electrical component at the same time.

The valve may be a 6-way valve.

The electrical component may include an electric power control unit (EPCU), or a motor, or an inverter, or an autonomous driving controller, or an on board charger (OBC).

The supply line may be connected to the coolant line when the coolant is circulated to the coolant line by the operation of the first water pump.

The battery cooling apparatus may further include a first coolant heater provided in the battery coolant line between the battery module and the chiller.

When the battery module is heated, the first coolant heater may be operated to heat a coolant supplied to the battery module along the battery coolant line.

When the battery module is heated, the battery coolant line may not be connected to the coolant line by the operation of the valve; the branch line and the chiller connection line may be closed by the operation of the valve; the coolant may circulate along the battery coolant line by the operation of the second water pump; and the first coolant heater may be operated to heat a coolant supplied to the battery module along the battery coolant line.

A described above, according to the thermal management system for the vehicle according to the exemplary embodiment of the present invention, the temperature of the battery module may be adjusted depending on the mode of the vehicle by use of one chiller for performing heat exchange between the coolant and the refrigerant, and the interior of the vehicle may be heated by use of the coolant, simplifying the entire system.

According to various exemplary embodiments of the present invention, it is also possible to improve the heating efficiency by recovering waste heat from the electrical component and using it for internal heating.

Furthermore, according to various exemplary embodiments of the present invention, it is possible to optimize the performance of the battery module by efficiently controlling the temperature of the battery module, and increase an overall travel distance of the vehicle through efficient management of the battery module.

Furthermore, according to various exemplary embodiments of the present invention may improve the cooling performance and reducing power consumption of a compressor by increasing condensation performance of the refrigerant using a condenser and a sub-condenser.

Furthermore, according to various exemplary embodiments of the present invention, manufacturing cost may be reduced and a weight may be reduced through simplification of an entire system, and spatial utilization may be enhanced.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
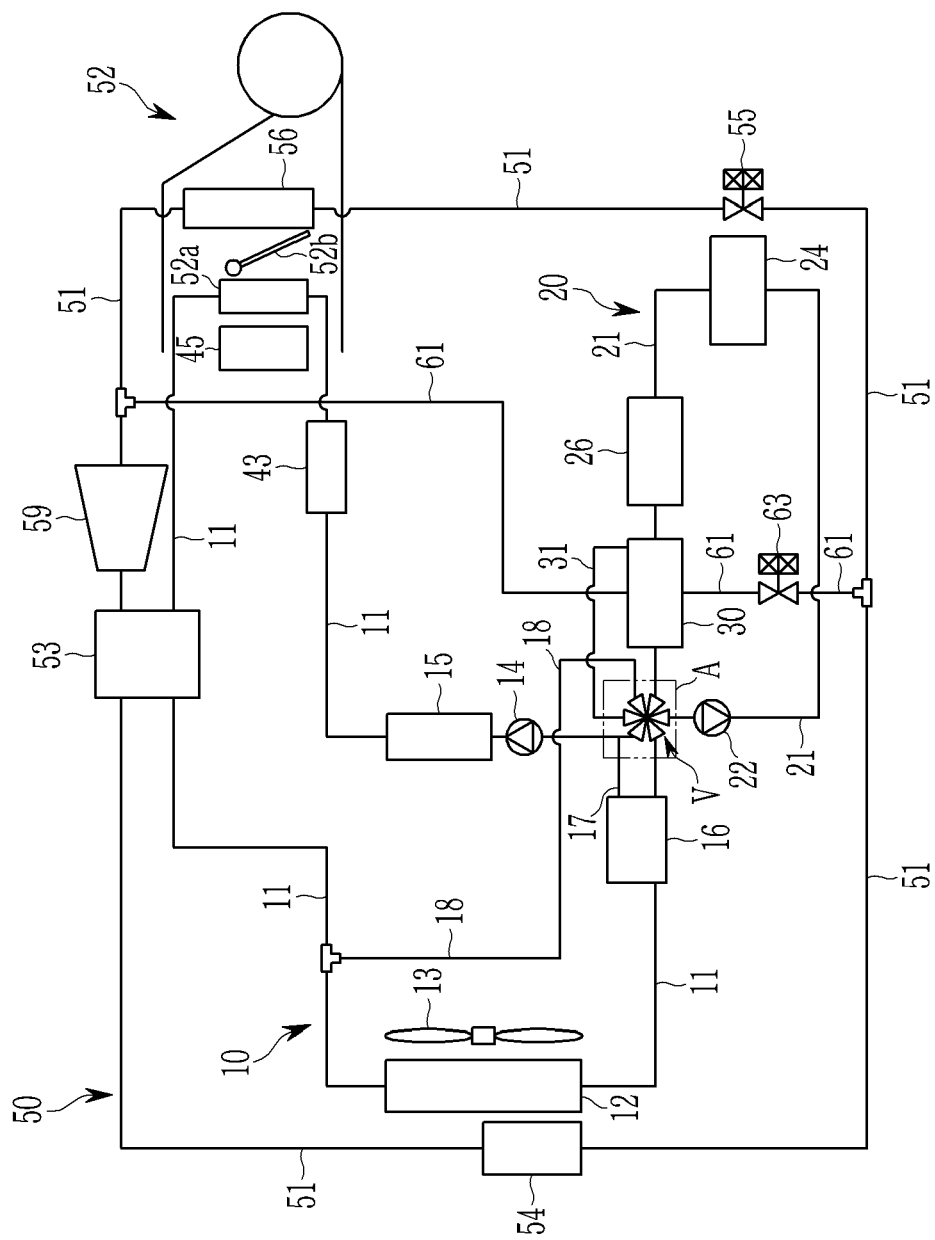
FIG. 1 illustrates a block diagram of a thermal management system for a vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Various exemplary embodiments of the present invention will hereinafter be described in detail with reference to the accompanying drawings.

Exemplary embodiments described in the exemplary embodiment and configurations shown in the drawings are just the most preferable exemplary embodiments of the present invention, but do not limit the spirit and scope of the present invention. Therefore, it may be understood that there may be various equivalents and modifications configured for replacing them at the time of filing of the present application.

To clarify the present invention, parts that are not connected with the description will be omitted, and the same elements or equivalents are referred to by the same reference numerals throughout the specification.

The size and thickness of each element are arbitrarily shown in the drawings, but the present invention is not necessarily limited thereto, and in the drawings, the thickness of layers, films, panels, regions, etc., are exaggerated for clarity.

Throughout the present specification and the claims which follow, unless explicitly described to the contrary, the word "comprise" or variations such as "comprises" or "comprising" will be understood to imply the inclusion of stated elements but not the exclusion of any other elements.

Furthermore, the terms, " . . . unit", " . . . mechanism", " . . . portion", " . . . member", etc. used herein mean a unit of inclusive components performing at least one or more functions or operations.

Figure 2:
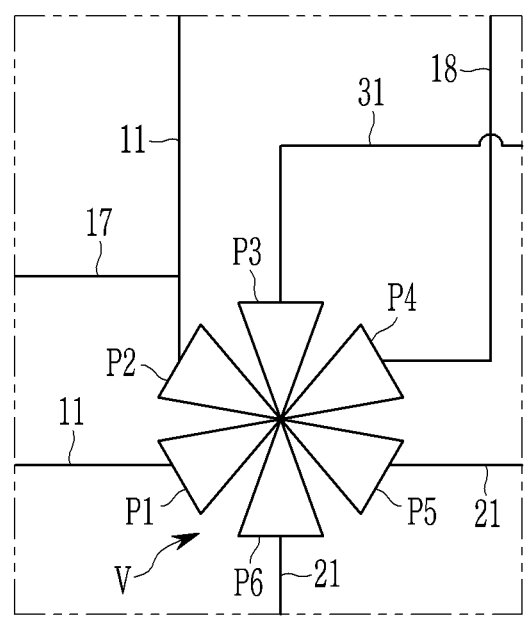
FIG. 2 is an enlarged view of part A of FIG. 1.

FIG. 1 illustrates a block diagram of a thermal management system for a vehicle according to various exemplary embodiments of the present invention, and FIG. 2 is an enlarged view of part one of FIG. 1.

According to the exemplary embodiment of the present invention, the thermal management system for a vehicle may adjust a temperature of a battery module 24 by use of one chiller 30 in which a refrigerant and a coolant are heat exchanged, and may recover waste heat generated from an electrical component 15 to use it for internal heating.

Such a thermal management system may be applied to electric vehicles.

Referring to FIG. 1, the thermal management system may include a cooling apparatus 10, a battery cooling apparatus 20, the chiller 30, and a heater 52a.

First, the cooling apparatus 10 includes a radiator 12 connected to a coolant line 11, a first water pump 14, a valve V, and a reservoir tank 16.

The radiator 12 is mounted in the front of the vehicle, and a cooling fan 13 is mounted behind the radiator 12, so that the coolant is cooled through an operation of the cooling fan 13 and heat exchange with the outside air.

Furthermore, the electrical component 15 may include an electric power control unit (EPCU), or a motor, or an inverter, or an autonomous driving controller, or an on board charger (OBC).

The electrical component 15 configured as described above may be provided in the coolant line 11 to be cooled in a water-cooled manner.

Accordingly, when the waste heat of the electrical component 15 is recovered in the heating mode of the vehicle, the heat generated from the EPCU, or the motor, or the inverter, or the autonomous driving controller, or the OBC may be recovered.

Also, the reservoir tank 16 is provided on the coolant line 11 between the radiator 12 and the first water pump 14. The coolant cooled in the radiator 12 may be stored in the reservoir tank 16.

This cooling apparatus 10 may circulate the coolant in the coolant line 11 through operation of the first water pump 14 such that the coolant is supplied to the electrical component 15 provided in the coolant line 11.

Meanwhile, the reservoir tank 16 may be connected to the coolant line 11 connecting the first valve V1 and the first water pump 14 through a supply line 17.

The supply line 17 may be connected to the coolant line 11 when the coolant is circulated to the coolant line 11 by the operation of the first water pump 14.

That is, when the first water pump 14 is operated, the reservoir tank 16 may always flow a portion of the stored coolant into the coolant line 11 through the supply line 17.

Accordingly, when the first water pump 14 is operated, the occurrence of cavitation in the first water pump 14 may be prevented. Furthermore, a damage of the first water pump 14 due to the cavitation may be prevented in advance.

Furthermore, the cooling apparatus 10 may further include a branch line 18.

A first end portion of the branch line 18 is connected to the coolant line 11 between the radiator 12 and the electrical component 15. A second end portion of the branch line 18 may be connected to the valve V.

When the waste heat of the electrical component 15 is recovered, the branch line 18 may be selectively opened and closed through the operation of the valve V so that the coolant that has passed through the electric equipment 15 is supplied back into the electric equipment 15 without passing through the radiator 12.

In the exemplary embodiment of the present invention, the battery cooling apparatus 20 includes a battery coolant line 21 connected to the coolant line 11 through the valve V and a second water pump 22 and the battery module 24 connected to the battery coolant line 21.

The battery cooling apparatus 20 may selectively circulate the coolant in the battery module 24 through an operation of the second water pump 22.

Herein, the first and second water pumps 14 and 22 may be electric water pumps.

Meanwhile, the battery cooling apparatus 20 may further include a first coolant heater 26 provided in the battery coolant line 21 between the battery module 24 and the valve V.

When it is required to increase the temperature of the battery module 24, the first coolant heater 26 is turned on to heat the coolant circulated in the battery coolant line 21 such that the coolant of which temperature is increased may be supplied to the battery module 24.

The first coolant heater 26 may be an electric heater that operates according to supply of electric power.

That is, the first coolant heater 26 is operated when the temperature of the coolant supplied to the battery module 24 is lower than the target temperature, so that the coolant circulating in the battery coolant line 21 may be heated.

Accordingly, the coolant having an increased temperature while passing through the first coolant heater 26 may be supplied to the battery module 24, to raise the temperature of the battery module 24.

That is, the first coolant heater 26 may selectively operate when the temperature of the battery module 24 is raised.

In the exemplary embodiment of the present invention, the chiller 30 is provided in the battery coolant line 21 between the valve V and the battery module 24.

The chiller 30 is connected to a refrigerant line 51 of an air conditioner 50 through a refrigerant connection line 61. That is, the chiller 30 may be a water-cooled heat exchanger into which a coolant flows.

Herein, the chiller 30 may be connected to the valve V through a chiller connection line 31.

That is, the chiller connection line 31 may connect the chiller 30 and the valve V separately from the battery coolant line 21 by the operation of the valve V.

Accordingly, the chiller 30 may regulate the temperature of the coolant by performing heat exchange between the coolant which is selectively supplied to the battery coolant line 21 and the chiller connection line 31, and the refrigerant which is selectively supplied from the air conditioner 50.

Herein, a first end portion of the chiller connection line 31 is connected to the valve V. A second end portion of the chiller connection line 31 may be connected to the chiller 30.

The chiller connection line 31 may connect the chiller 30 to the valve V according to the operation of the valve V.

The heater 52a is provided in the coolant line 11 between the electrical component 15 and the radiator 12 to heat a vehicle interior by use of the coolant.

Accordingly, when heating an interior of the vehicle, the high-temperature coolant that has passed through the electrical component 15 may be supplied to the heater 52a.

That is, the high temperature coolant passing through the electrical component 15 is supplied to the heater 52a through operation of the first water pump 14 in the heating mode of the vehicle, heating the vehicle interior.

The heater 52a may be provided inside a heating, ventilation, and air conditioning (HVAC) module 52 included in the air conditioner 50.

Herein, a second coolant heater 43 to selectively heat the coolant circulating in the coolant line 11 may be provided in the coolant line 11 between the electrical component 15 and the heater 52a.

The second coolant heater 43 is ON-operated when the temperature of the coolant supplied to the heater 52a in the heating mode of the vehicle is lower than a target temperature to heat the coolant circulated in the coolant line 11, inflowing the coolant of which the temperature is increased to the heater 52a.

The second coolant heater 43 may be an electric heater that operates according to the power supply.

On the other hand, in the exemplary embodiment of the present invention, it is described that the second coolant heater 43 is provided in the coolant line 11, however it is not limited thereto, and an air heater 45 to increase the temperature of the outside air inflowing to the interior of the vehicle may be applied instead of the second coolant heater 43.

The air heater 45 may be mounted on the rear of the heater 52a toward the interior of the vehicle inside the HVAC module 52 to selectively heat the outside air passing through the heater 52a.

That is, any one of the second coolant heater 43 and the air heater 45 may be applied to the heater 52a.

The heater 52a configured as described above is supplied with the coolant whose temperature has increased while passing through the electrical component 15 in the heating mode of the vehicle through operation of the first water pump 14, heating the vehicle interior.

In the exemplary embodiment of the present invention, the air conditioner 50 includes the HVAC module 52, a condenser 53, sub-condenser 54, a first expansion valve 55, an evaporator 56, and a compressor 59 which are connected through the refrigerant line 51.

First, the HVAC module 52 includes the evaporator 56 connected therewith through the refrigerant line 51, and an opening and closing door 52b for controlling the outside air passing through the evaporator 56 to be selectively introduced into the heater 52a depending on cooling mode, heating mode, and heating and dehumidification modes of the vehicle therein.

That is, the opening and closing door 52b is opened to allow the outside air passing through the evaporator 56 to be introduced into the heater 52a in the heating mode of the vehicle. In contrast, in the cooling mode of the vehicle, the opening and closing door 52b closes off the heater 52a such that the outside air which is cooled while passing through the evaporator 56 directly flows into the vehicle.

Herein, when the second coolant heater 43 is not provided in the coolant line 11, the air heater 45 provided in the HVAC module 52 may be provided at an opposite side of the evaporator 56 with the heater 52a interposed therebetween.

The air heater 45 may be operated to raise the temperature of the outside air flowing into the heater 52a when the temperature of the coolant supplied to the heater 52a is lower than a target temperature for internal heating.

On the other hand, the air heater 45 may be provided inside the HVAC module 52 when the second coolant heater 43 is not provided in the coolant line 11.

That is, in the thermal management system according to various exemplary embodiments of the present invention, only one of the second coolant heater 43 and the air heater 45 may be applied.

In the exemplary embodiment of the present invention, the condenser 53 is connected to the refrigerant line 51 to allow the refrigerant to pass therethrough. The condenser 53 is provided on the coolant line 11 between the heater 52a and the radiator 12 such that the coolant circulating the coolant line 11 passes through.

This condenser 53 may condense the refrigerant through heat exchange with the coolant circulating the coolant line 11. That is, the condenser 53 may be a water-cooled heat exchanger into which the coolant flows.

The condenser 53 configured as described above may perform heat exchange between the refrigerant supplied from the compressor 59 and the coolant supplied from the cooling apparatus 10 to condense the refrigerant.

In the exemplary embodiment of the present invention, the sub-condenser 54 may be provided in the refrigerant line 51 between the condenser 53 and the evaporator 56.

Herein, the sub-condenser 54 may further condense the refrigerant condensed in the condenser 53 through heat exchange with the outside air. In other words, the sub-condenser 54 is mounted in front of the radiator 12 to mutually heat exchange the coolant that has been inflowed therein with the outside air.

As a result, the sub-condenser 54 may be an air-cooled heat exchanger for condensing the refrigerant by use of outside air.

Accordingly, the sub-condenser 54 may further condense the refrigerant which is condensed in the condenser 53 to increase subcooling of the coolant, improving a coefficient of performance (COP), which is a coefficient of the cooling capacity relative to the power required by the compressor.

The first expansion valve 55 is provided in the refrigerant line 51 between the sub-condenser 54 and the evaporator 56. The first expansion valve 55 receives the refrigerant passing through the second condenser 54 to expand it.

In the exemplary embodiment of the present invention, a first end portion of the refrigerant connection line 61 is connected to the refrigerant line 51 between the sub-condenser 54 and the first expansion valve 55. A second end portion of the refrigerant connection line 61 may be connected to the refrigerant line 51 between the evaporator 56 and the compressor 59.

Herein, a second expansion valve 63 is provided in the refrigerant connection line 61. The second expansion valve 63 may expand the refrigerant flowing through the refrigerant connection line 61 to introduce it into the chiller 30 when the battery module 24 is cooled by the coolant heat exchanged with the refrigerant.

This second expansion valve 63 is operated to expand the refrigerant, when the battery module 24 is cooled by use of the coolant heat exchanged with the refrigerant.

That is, the second expansion valve 63 may introduce the refrigerant exhausted from the sub-condenser 54 into the chiller 30 in a state where the temperature of the refrigerant is reduced by expanding the refrigerant, to further reduce the temperature of the coolant passing through the interior of the chiller 30.

As a result, the coolant having the temperature which is reduced while passing through the chiller 30 is introduced into the battery module 24, being more efficiently cooled.

The compressor 59 is connected thereto between the evaporator 56 and the condenser 53 through the refrigerant line 51. The present compressor 59 may compress the gaseous refrigerant and supply the compressed refrigerant to the condenser 53.

Herein, the first and second expansion valves 55 and 63 may be electronic expansion valves that selectively expand the coolant while controlling a flow of the refrigerant through the coolant line 51 or the refrigerant connection line 61.

Furthermore, the valve V may be a 6-Way valve.

Herein, a structure of the valve V will be described in more detail with reference to FIG. 2.

In the exemplary embodiment of the present invention, the valve V may include first, second, third, fourth, fifth, and sixth ports P1, P2, P3, P4, P5, and P6.

First, the first port P1 is connected to the coolant line 11 connected to the reservoir tank 16.

The second port P2 is connected to the coolant line 11 connected to the first water pump 14.

Herein, the supply line 17 may be connected to the coolant line 11 connecting the second port P2 and the first water pump 14.

The third port P3 is connected to the chiller connection line 31, and the fourth port P4 is connected to the branch line 18.

The fifth port P5 is connected to the battery coolant line 21 connected to the chiller 30 between the chiller 30 and the valve V.

The sixth port P6 is connected to the battery coolant line 21 connected to the second water pump 22.

Herein, the valve V may be operated to discharge the coolant through a port adjacent to the port into which the coolant is introduced among the first to sixth ports P1, P2, P3, P4, P5, and P6.

For example, the coolant introduced into the first port P1 may be discharged through the second port P2 or the sixth port P6 mounted adjacent to the first port P1 according to the operation of the valve V.

That is, the valve V is configured to simplify the structure, and for convenience of valve control, when two ports adjacent to each other are closed, remaining four ports are opened so that two ports adjacent to each other are connected to each other, controlling the flow of the coolant.

Also, the valve V may be operated so that the remaining two ports are connected to each other to control the flow of the coolant, when the four ports adjacent to each other are closed.

Hereinafter, an operation and function of the thermal management system for the vehicle according to the exemplary embodiment of the present invention configured as described above will be described in detail with reference to FIG. 3, FIG. 4, FIG. 5, FIG. 6, and FIG. 7.

First, an operation of a case of cooling the electrical component 15 and the battery module 24 using the coolant cooled in the radiator 12 in the thermal management system for the vehicle according to the exemplary embodiment of the present invention will be described with reference to FIG. 3.

Figure 3:
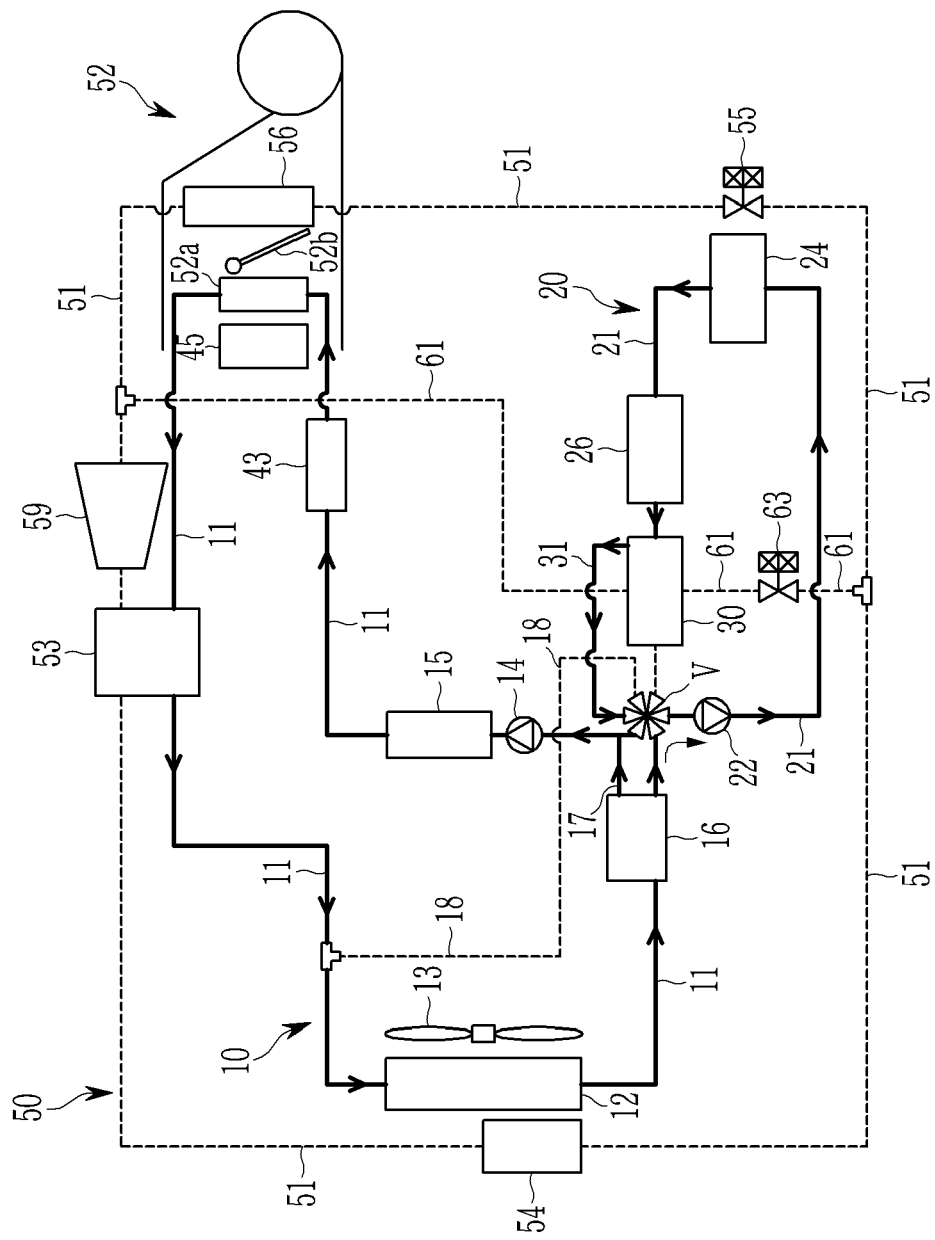
FIG. 3 illustrates an operational state diagram for cooling electrical components and a battery module by use of a radiator in a thermal management system for a vehicle according to various exemplary embodiments of the present invention.

FIG. 3 illustrates an operational state diagram for cooling electrical components and a battery module by use of a radiator in a thermal management system for a vehicle according to various exemplary embodiments of the present invention.

Referring to FIG. 3, the branch line 18 is closed through operation of the valve V. The chiller connection line 31 is opened through operation of the valve V.

The supply line 17 is opened. That is, a part of the coolant stored in the reservoir tank 16 may be circulated along the coolant line 11 through the opened supply line 17.

Herein, a portion of the battery coolant line 21 connecting the chiller 30 and the valve V through operation of the valve V is closed.

Furthermore, the battery coolant line 21 is connected to the coolant line 11 by the operation of the valve V.

The coolant line 11 connecting the reservoir tank 16 and the valve V is connected to the battery coolant line 21 through operation of the valve V.

In the present state, in the cooling apparatus 10, the first water pump 14 is operated to cool the electrical component 15.

In the battery cooling apparatus 20, the second water pump 22 is operated to cool the battery module 24.

Accordingly, the coolant which is cooled in the radiator 12 and stored in the reservoir tank 16 is supplied to the battery module 24, while circulating through the battery coolant line 21 by operations of the valve V and the second water pump 22.

That is, the coolant introduced into the valve V from the reservoir tank 16 through the first port P1 is introduced into the battery coolant line 21 through the sixth port P6.

The coolant introduced into the battery coolant line 21 passes through the battery module 24 and is introduced into the chiller 30.

Accordingly, the coolant passing through the battery module 24 is introduced from the chiller 30 to the valve V along the opened chiller connection line 31. Thereafter, the coolant may be supplied to the electrical component 15 while flowing along the coolant line 11 connected to the first water pump 14 by the operation of the first water pump 14.

That is, the coolant discharged from the chiller 30 is introduced into the third port P3 of the valve V along the opened chiller connection line 31, and is discharged to the coolant line 11 connected to the first water pump 14 through the second port P2.

Herein, a part of the coolant stored in the reservoir tank 16 may be circulated along the coolant line 11 through the opened supply line 17.

That is, the coolant cooled in the radiator 12 and stored in the reservoir tank 16 circulates through the coolant line 11 and the battery coolant line 21 by the operations of the first and second water pumps 14 and 22, respectively, to efficiently cool the electrical component 15 and the battery module 24.

The air conditioner 50 is not operated because the cooling mode of the vehicle is deactivated.

On the other hand, although it has been described in the exemplary embodiment of the present invention that both of the electrical component 15 and the battery module 24 are cooled, the present invention is not limited thereto, and when one of the electrical component 15 and the battery module 24 is separately cooled, the first and second water pumps 14 and 22, and the valve V may be selectively operated.

An operation of the case of cooling the battery module 24 in the cooling mode of the vehicle will be described with respect to FIG. 4.

Figure 4:
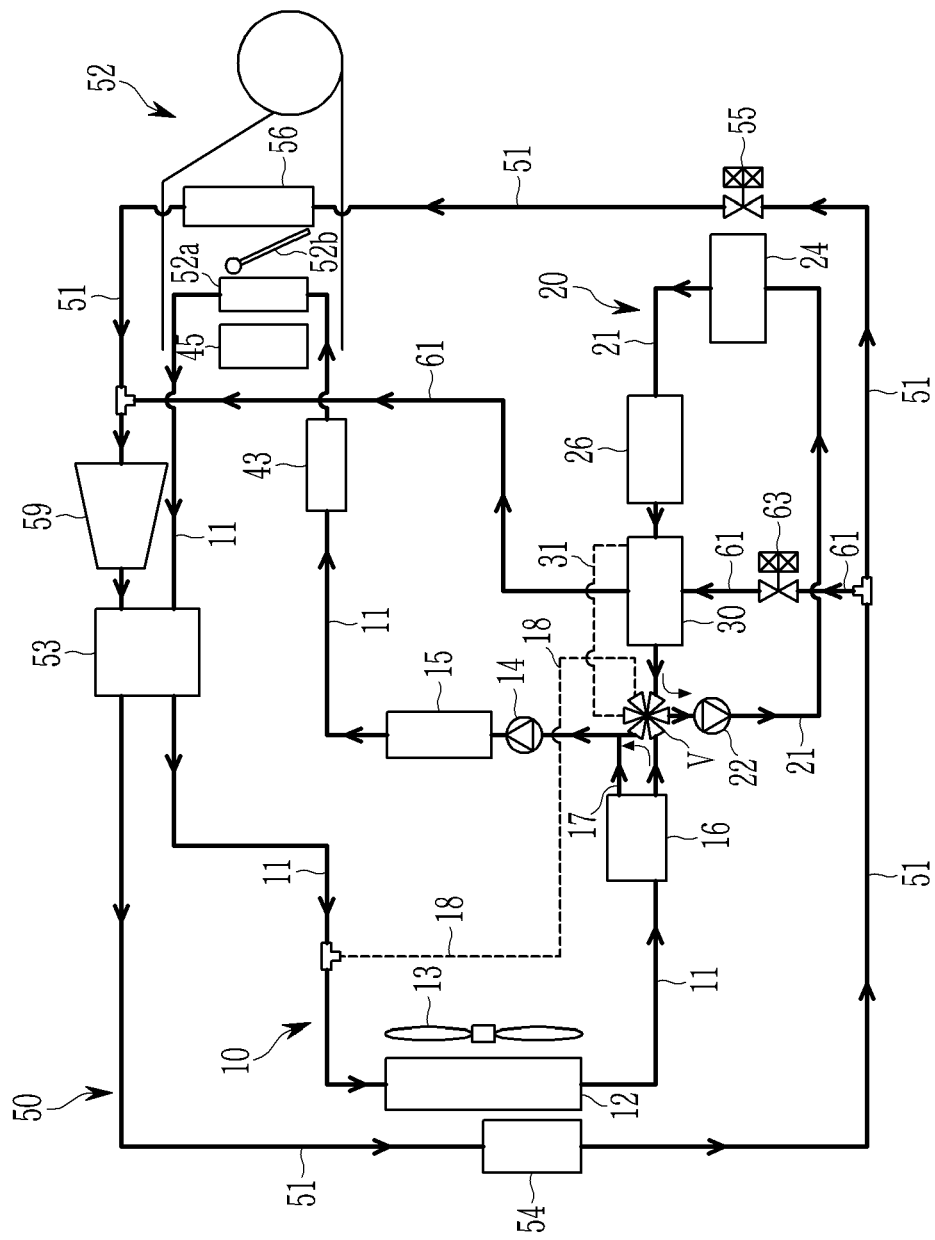
FIG. 4 illustrates an operational state diagram for cooling a battery module by use of a refrigerant in a cooling mode of a vehicle in a thermal management system for a vehicle according to various exemplary embodiments of the present invention.

FIG. 4 illustrates an operational state diagram for cooling a battery module by use of a refrigerant in a cooling mode of a vehicle in a thermal management system for a vehicle according to various exemplary embodiments of the present invention.

Referring to FIG. 4, in the cooling apparatus 10, the coolant is circulated in the coolant line 11 by the operation of the first water pump 14. At the same time, the supply line 17 is opened.

That is, a part of the coolant stored in the reservoir tank 16 may be circulated along the coolant line 11 through the opened supply line 17.

Herein, the branch line 18 and the chiller connection line 31 are closed through operation of the valve V.

Accordingly, the coolant introduced into the valve V from the reservoir tank 16 through the first port P1 may be introduced into the coolant line 11 through the second port P2.

In the battery cooling apparatus 20, the second water pump 22 is operated to cool the battery module 24.

Accordingly, in the battery cooling apparatus 20, the coolant may be circulated in the battery coolant line 21 by the operation of the second water pump 22.

Herein, the cooling apparatus 10 and the battery cooling apparatus 20 may form an independent closed circuit through which each coolant is separately circulated by the operation of the valve V.

That is, the battery cooling apparatus 20 is not connected to the coolant line 11 by the operation of the valve V.

In the present state, the battery cooling apparatus 20 may form a closed circuit through which the coolant is independently circulated in the battery coolant line 21 by operation of the second water pump 22.

That is, the coolant line 11 and the battery coolant line 21 form independent closed circuits through operation of the valve V, respectively.

Accordingly, in the battery cooling apparatus 20, the coolant passing through the chiller 30 may be supplied to the battery module 24 along the battery coolant line 21 through operation of the second water pump 22.

The coolant introduced into the battery coolant line 21 is passed through the battery module 24 and is introduced into the chiller 30.

Accordingly, the coolant passing through the battery module 24 is introduced from the chiller 30 to the valve V along the opened battery coolant line 21. Thereafter, the coolant may be supplied to the battery module 24 while flowing along the battery coolant line 21 by the operation of the second water pump 22.

That is, the coolant discharged from the chiller 30 is introduced into the fifth port P5 of the valve V along the battery coolant line 21, and is discharged to the battery coolant line 21 connected to the second water pump 22 through the sixth port P6.

Meanwhile, in the cooling apparatus 10, the coolant is circulated in the coolant line 11 by the operation of the first water pump 14.

Accordingly, the coolant cooled in the radiator 12 may be supplied to the condenser 53 through operation of the first and third water pump 14 and 42, after passing through the electrical component 15.

In the air conditioner 50, each constituent element operates to cool the interior of the vehicle. Accordingly, the refrigerant is circulated along the refrigerant line 51.

Herein, the refrigerant line 51 connecting the sub-condenser 54 and the evaporator 56 is opened through operation of the first expansion valve 55. The refrigerant connection line 61 is opened through operation of the second expansion valve 63.

Accordingly, the refrigerant having passed through the sub-condenser 54 may be circulated along the refrigerant line 51 and the refrigerant connection line 61.

Herein, the first and second expansion valves 55 and 63 may expand the refrigerant such that the expanded refrigerant is supplied to the evaporator 56 and the chiller 30, respectively.

The condenser 53 condenses the refrigerant by use of the coolant flowing along the heating line 41. Also, the sub-condenser 54 may further condense the refrigerant introduced from the condenser 53 through heat exchange with the outside air.

The coolant passing through the chiller 30 is circulated in the battery coolant line 21 to cool the battery module 24 through operation of the second water pump 22.

The coolant passing through the chiller 30 is cooled through heat exchange with the expanded refrigerant which is supplied to the chiller 30. The coolant cooled in the chiller 30 is supplied to the battery module 24. Accordingly, the battery module 24 is cooled by the cooled coolant.

That is, the second expansion valve 63 expands some of the coolant through the sub-condenser 54 to supply the expanded coolant to the chiller 30, and opens the refrigerant connection line 61.

Accordingly, the refrigerant discharged from the sub-condenser 54 is expanded to enter a low-temperature and low-pressure state through operation of the second expansion valve 63, and flows into the chiller 30 connected to the refrigerant connection line 61.

Thereafter, the refrigerant flowing into the chiller 30 is performed heat exchange with the coolant, and then is introduced into the compressor 59 through the refrigerant connection line 61.

In other words, the coolant with the increased temperature from cooling the battery module 24 is cooled through heat exchange with the low temperature low pressure refrigerant inside the chiller 30. The cooled coolant is again supplied to the battery module 24 through the battery coolant line 21.

That is, the coolant may efficiently cool the battery module 24 while repeating the above-described operation.

On the other hand, the remaining refrigerant discharged from the sub-condenser 54 flows through the refrigerant line 51 to cool the interior of the vehicle, and sequentially passes through the first expansion valve 55, the evaporator 56, the compressor 59, and the condenser 53.

Herein, the outside air flowing into the HVAC module 52 is cooled while passing through the evaporator 56 by the low-temperature refrigerant flowing into the evaporator 56.

In the instant case, a portion of the heater 52a through which the cooled outside air passes is closed by the opening and closing door 52b such that the outside air does not pass through the heater 52a. Accordingly, the cooled outside air directly flows into the interior of the vehicle, cooling the vehicle interior.

On the other hand, the coolant having an amount of condensation which is increased while sequentially passing through the condenser 53 and the sub-condenser 54 may be expanded and supplied to the evaporator 56, allowing the refrigerant to be evaporated to a lower temperature.

As a result, in the exemplary embodiment of the present invention, the condenser 53 condenses the refrigerant, and the sub-condenser 54 further condenses the refrigerant, which is advantageous in forming the sub-cooling of the refrigerant.

Furthermore, as the sub-cooled refrigerant may be evaporated to a lower temperature in the evaporator 56, the temperature of the outside air passing through the evaporator 56 may be further lowered, improving cooling performance and efficiency.

The refrigerant may cool the interior of the vehicle in the cooling mode of the vehicle while repeating the above-described processes, and at the same time, may cool the coolant through the heat exchange while passing through the chiller 30.

The low-temperature coolant cooled in the chiller 30 is introduced into the battery module 24. Accordingly, the battery module 24 may be efficiently cooled by the low-temperature coolant supplied therefrom.

In the exemplary embodiment of the present invention, an operation of the case of using the waste heat of the electrical component 15 without operating the air conditioner 50 in the heating mode of the vehicle will be described with reference to FIG. 5.

Figure 5:
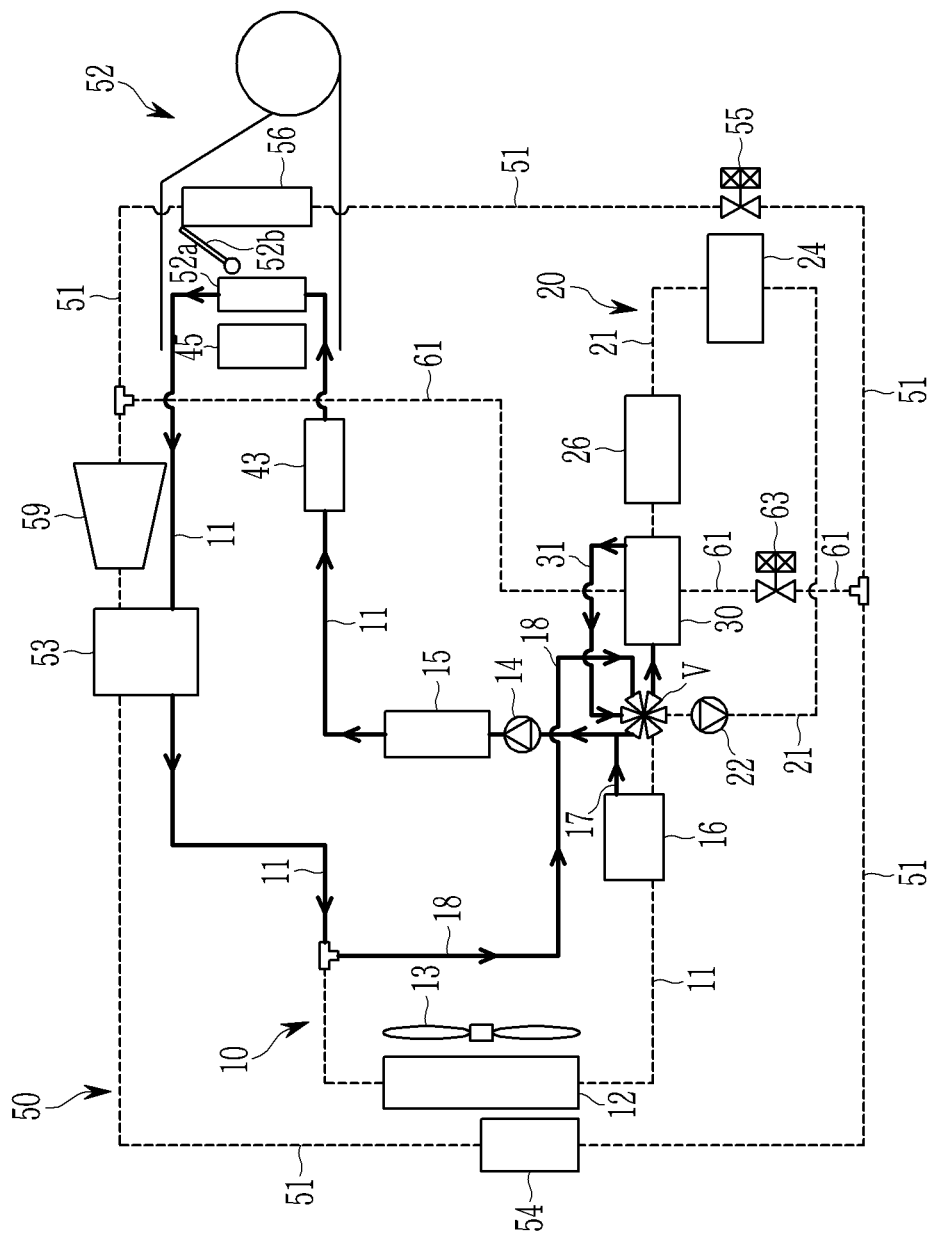
FIG. 5 illustrates an operational state diagram for performing the heating mode using waste heat of an electrical component in a thermal management system for a vehicle according to various exemplary embodiments of the present invention.

FIG. 5 illustrates an operational state diagram for performing the heating mode using waste heat of an electrical component in a thermal management system for a vehicle according to various exemplary embodiments of the present invention.

Referring to FIG. 5, the thermal management system may perform heating the interior of the vehicle by use of waste heat from the electrical component 15 without operating the air conditioner 50.

First, in the cooling apparatus 10, the first water pump 14 is operated for circulation of the coolant. In the instant case, the air conditioner 50 is deactivated.

Herein, the branch line 18 and the chiller connection line 31 are opened through operation of the valve V. The supply line 17 is opened.

Thus, a part of the coolant stored in the reservoir tank 16 may be circulated along the coolant line 11 through the opened supply line 17.

Accordingly, on the basis of the branch line 18, a portion of the coolant line 11 connected to the radiator 12 and a portion of the coolant line 11 connecting the radiator 12 and the reservoir tank 16 are closed through operation of the valve V.

That is, on the basis of the branch line 18, the portion of the coolant line 11 connected to the radiator 12, the reservoir tank 16, and the valve V may be closed.

Furthermore, the battery coolant line 21 except for the battery coolant line 21 connected to the chiller 30 is closed through operation of the valve V.

In the present state, the coolant passing through the electrical component 15 may circulate along the opened branch line 18 and an opened portion of the coolant line 11 without passage through the radiator 12 through operation of the first water pump 14.

Herein, the coolant introduced into the valve V through the branch line 18 may be introduced into the chiller 30 along a portion of the battery coolant line 21 connecting the chiller 30 and the valve V.

The coolant passing through the chiller 30 is introduced into the valve V along the opened chiller connection line 31. Thereafter, the coolant is circulated in the coolant line 11 connected to the electrical component 15 through the valve V.

Meanwhile, in the battery cooling apparatus 20, the second water pump 22 is deactivated.

That is, the battery coolant line 21 connecting the second water pump 22 and the battery module 24 is closed, and the operation of the battery cooling apparatus 20 is deactivated.

Thus, the coolant passing through the electrical component 15 continuously circulates along the coolant line 11, the branch line 18, an opened portion of the battery coolant line 21, and the chiller connection line 31 without passing through the radiator 12, and absorbs the waste heat from the electrical component 15 such that the temperature is increased.

That is, the coolant introduced from the branch line 18 to the valve V through the fourth port P4 is introduced into the battery coolant line 21 connected to the chiller through the fifth port P5.

Thereafter, the coolant passing through the chiller 30 is introduced into the third port P3 of the first valve V1 along the opened chiller connection line 31. The coolant introduced into the third port P3 is discharged to the coolant line 11 connected to the first water pump 14 through the second port P2 connected to the third port P3.

While repeatedly performing such an operation, the coolant absorbs the waste heat from the electric component 15 and may increase the temperature.

The coolant having a temperature that has risen while passing through the electrical component 15 by the operation of the first water pump 14 is supplied to the heater 52a along the opened coolant line 11 without passing through the radiator 12.

The coolant discharged from the heater 52a is introduced into the valve V along the opened coolant line 11 and the opened branch line 18.

The coolant introduced into the valve V is again introduced into the valve V along the opened chiller connection line 31 after passing through the chiller 30 along the opened portion of the battery coolant line 21.

The coolant again introduced into the valve V is supplied to the electrical component 15 along the opened the coolant line 11.

That is, the coolant that has passed through the electrical component 15 continues to circulate along the opened coolant line 11, the branch line 18, the opened portion of the battery coolant line 21, and the chiller connection lines 31 without passing through the radiator 12, and absorbs the waste heat from the electric component 15 such that the temperature thereof increases.

The coolant having the temperature that has been raised is introduced into the heater 52a along the coolant line 11 without passing through the radiator 12.

Herein, the second coolant heater 43 is operated when the temperature of the coolant circulating along the coolant line 11 is lower than the target temperature, so that the coolant circulating in the coolant line 11 may be heated.

On the other hand, when the air heater 45 is applied instead of the second coolant heater 43, the air heater 45 may be selectively operated depending on the temperature of the outside air passing through the heater 52a.

That is, the air heater 45 may be operated when the temperature of the outside air passing through the heater 52a is lower than a target temperature, heating the outside air flowing into the interior of the vehicle.

The air heater 45 is operated when the temperature of the outside air that has completed heat exchange with the high-temperature coolant while passing through the heater 52a is lower than a predetermined temperature or a target heating temperature.

When the air heater 45 is operated, the outside air may be heated while passing through the air heater 45, to be introduced into the vehicle interior in a state where the temperature is raised.

Meanwhile, the high-temperature coolant supplied to the heater 52a performs heat exchange with the outside air, and then is introduced into the coolant line 11.

Thereafter, the coolant is introduced into the valve V along the opened branch line 18 without passing through the radiator 12.

The coolant introduced into the valve V sequentially passes the opened battery coolant line 21, the chiller 30, and the chiller connection line 31, and is again introduced into the coolant line 11 connected to the electrical component 15.

Meanwhile, the opening and closing door 52b is opened such that the outside air flowing into the HVAC module 52 passes through the heater 52a.

As a result, the outside air inflow from the outside thereof flows into the internal in an uncooled temperature state when passing through the evaporator 56, which is not supplied with the refrigerant. The introduced outside air is converted to a high temperature state while passing through the heater 52a to be introduced into the interior of the vehicle, realizing the heating of the interior of the vehicle.

In other words, according to various exemplary embodiments of the present invention, it is possible to recover the waste heat generated in the electrical component 15 while repeating the above-described process, and use the waste heat for internal heating, reducing power consumption and improving overall heating efficiency.

In the exemplary embodiment of the present invention, an operation of the case of using the waste heat of the electrical component 15 without operating the air conditioner 50 and the cooling of the electrical component 15 is required in the heating mode of the vehicle will be described with reference to FIG. 6.

Figure 6:
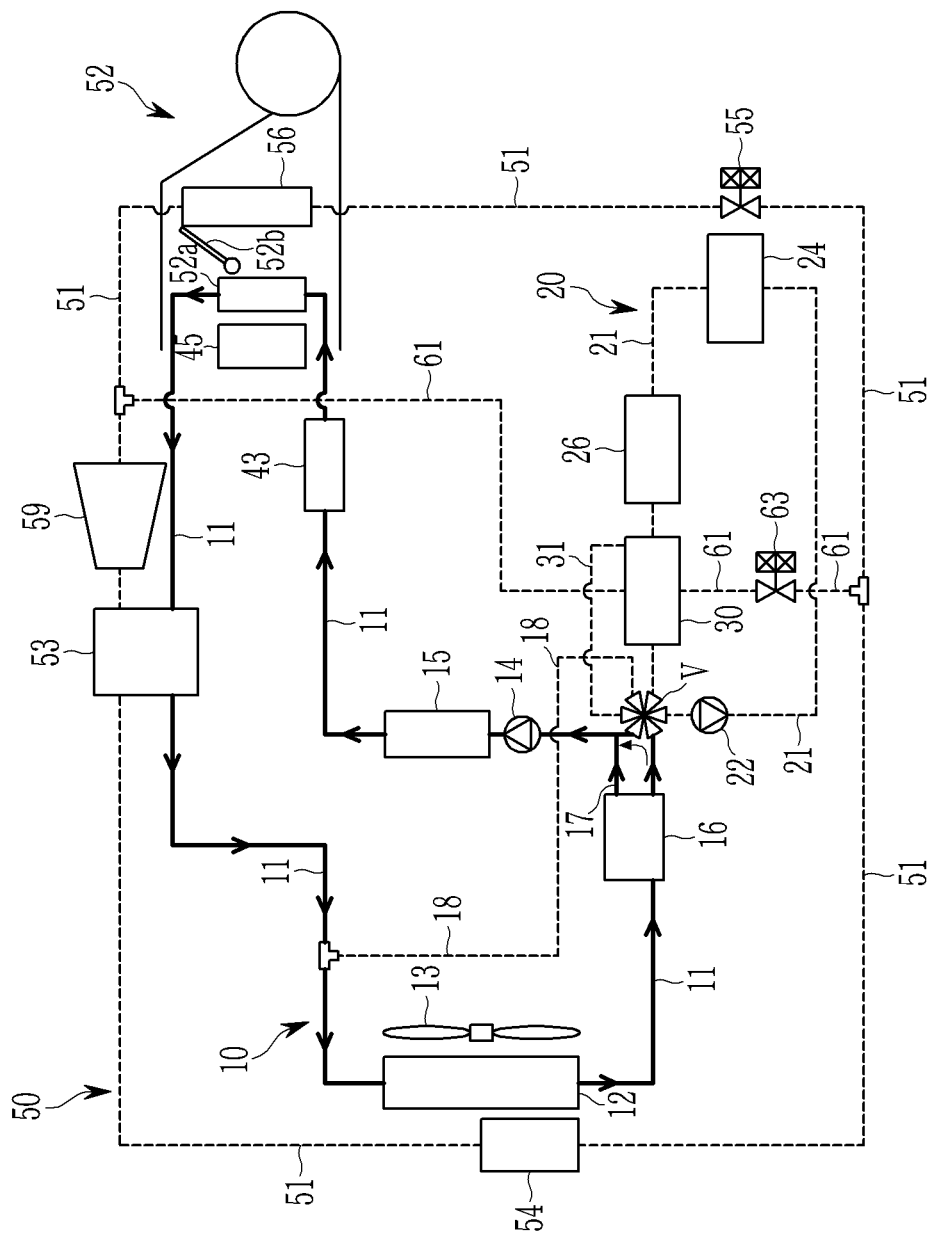
FIG. 6 illustrates an operational state diagram for cooling an electrical component while performing the heating mode using waste heat of the electrical component in a thermal management system for a vehicle according to various exemplary embodiments of the present invention.

FIG. 6 illustrates an operational state diagram for cooling an electrical component while performing the heating mode using waste heat of the electrical component in a thermal management system for a vehicle according to various exemplary embodiments of the present invention.

Referring to FIG. 6, the thermal management system perform heating the interior of the vehicle by use of waste heat from the electrical component 15 without operating the air conditioner 50, and cool the electrical component 15 at same time.

First, in the cooling apparatus 10, the first water pump 14 is operated for circulation of the coolant.

Herein, the branch line 18 and the chiller connection line 31 are closed through operation of the valve V. The supply line 17 is opened.

Thus, a part of the coolant stored in the reservoir tank 16 may be circulated along the coolant line 11 through the opened supply line 17.

Accordingly, the coolant introduced into the first valve V1 from the reservoir tank 16 through the first port P1 may be introduced into the coolant line 11 through the second port P2.

The battery coolant line 21 connecting the second water pump 22 and the battery module 24 is closed, and the operation of the battery cooling apparatus 20 is deactivated.

In the present state, the coolant having a temperature that has risen while passing through the electrical component 15 by the operation of the first water pump 14 is supplied to the heater 52a along the coolant line 11.

The coolant discharged from the heater 52a is introduced into the coolant line 11.

Thereafter, the coolant introduced into the coolant line 11 is cooled while passing through the radiator 12, and is again introduced into the electrical component 15 along the coolant line 11 through operation of the first water pump 14.

That is, the coolant passing through the electrical component 15 absorbs the waste heat from the electric component 15 such that the temperature thereof increases, and is supplied to the heater 52a through the coolant line 11.

Through the present operation, the coolant of which the temperature is increased by absorbing the waste heat of the electrical component 15 circulates through the heater 52a. Thereafter, the coolant is cooled while passing through the radiator 12 through operation of the first water pump 14.

The coolant that has been completely cooled may recover waste heat while passing through the electrical component 15, and at the same time, may efficiently cool the electrical component 15.

Meanwhile, the coolant having a temperature that has risen while passing through the electrical component 15 is circulated to the heater 52a along the coolant line 11 through operation of the first water pump 14.

Herein, the second coolant heater 43 is operated when the temperature of the coolant circulating along the coolant line 11 is lower than the target temperature, so that the coolant circulating in the coolant line 11 may be heated.

On the other hand, when the air heater 45 is applied instead of the second coolant heater 43, the air heater 45 may be selectively operated depending on the temperature of the outside air passing through the heater 52a.

That is, the air heater 45 may be operated when the temperature of the outside air passing through the heater 52a is lower than a target temperature, heating the outside air flowing into the interior of the vehicle.

The air heater 45 is operated when the temperature of the outside air that has completed heat exchange with the high-temperature coolant while passing through the heater 52a is lower than a predetermined temperature or a target heating temperature.

When the air heater 45 is operated, the outside air may be heated while passing through the air heater 45, to be introduced into the vehicle interior in a state where the temperature is raised.

Herein, the opening and closing door 52b is opened such that the outside air flowing into the HVAC module 52 passes through the heater 52a.

As a result, the outside air inflow from the outside thereof flows into the internal in an uncooled temperature state when passing through the evaporator 56, which is not supplied with the refrigerant. The introduced outside air is converted to a high temperature state while passing through the heater 52a to be introduced into the interior of the vehicle, realizing the heating of the interior of the vehicle.

On the other hand, the coolant discharged from the heater 52a is cooled while passing through the radiator 12 along the coolant line 11 through operation of the first water pump 14.

Thereafter, the cooled coolant may recover waste heat from the electrical component 15 while passing through the electrical component 15 and cool the electrical component 15 at the same time.

As a result, the coolant cooled in the radiator 12 may be supplied to the electrical component 15, preventing the electrical component 15 from overheating.

In other words, according to various exemplary embodiments of the present invention, it is possible to recover the waste heat generated in the electrical component 15 while repeating the above-described process, and use the waste heat for internal heating, reducing power consumption and improving overall heating efficiency.

Furthermore, in various exemplary embodiments of the present invention, as the coolant that has passed through the heater 52a is cooled in the radiator 12 and supplied to the electrical component 15, and the coolant may recover waste heat while passing through the electrical component 15 and efficiently cool the electrical component 15 at the same time.

An operation of the case of heating the battery module 24 will be described with respect to FIG. 7.

Figure 7:
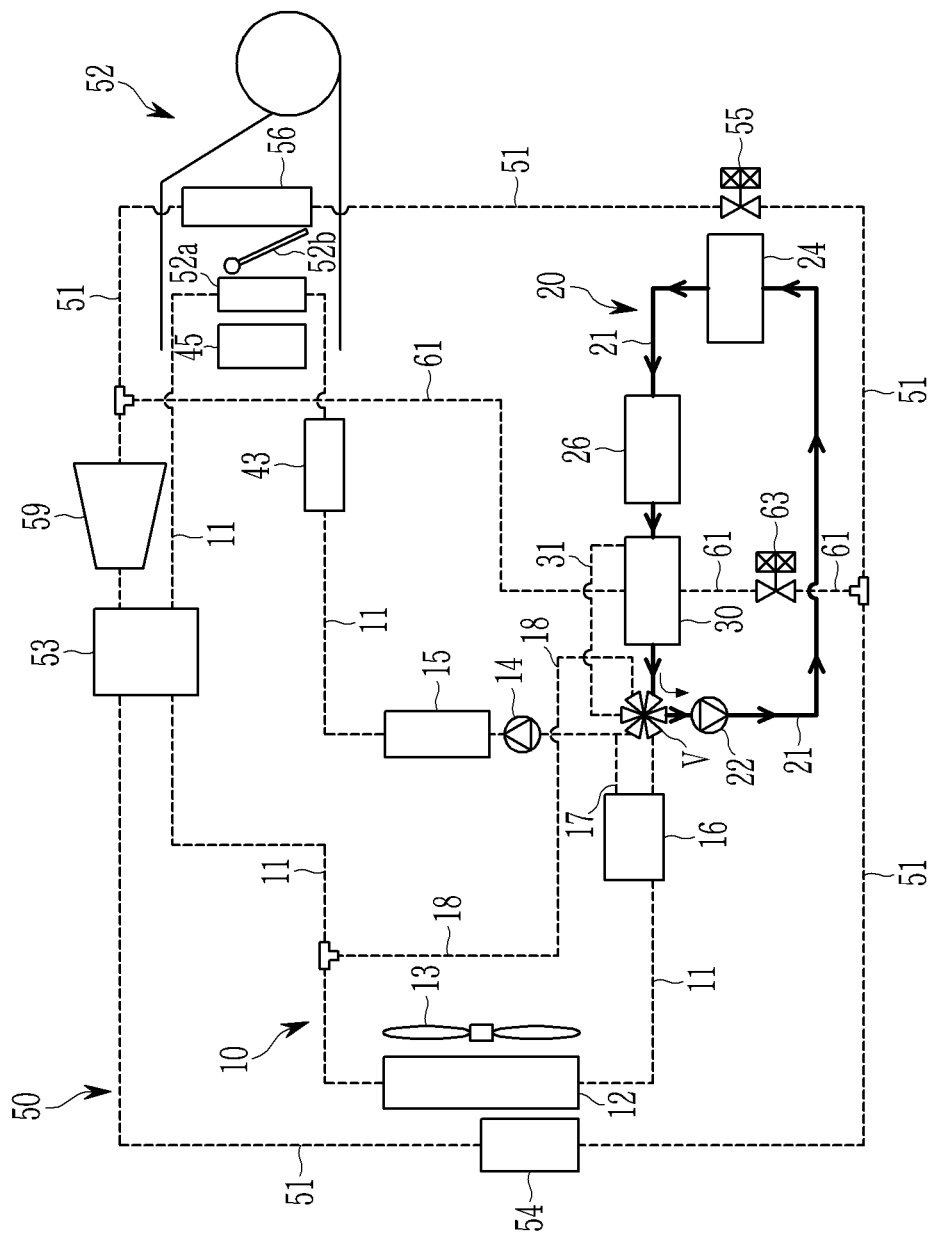
FIG. 7 illustrates a detailed perspective view for heating a battery module in a thermal management system for a vehicle according to various exemplary embodiments of the present invention.

FIG. 7 illustrates a detailed perspective view for heating a battery module in a thermal management system for a vehicle according to various exemplary embodiments of the present invention.

Referring to FIG. 7, the cooling apparatus 10 and the air conditioner 50 are deactivated.

The branch line 18 and the chiller connection line 31 are closed by the operation of the valve V.

Furthermore, the battery coolant line 21 is not connected to the coolant line 11 by the operation of the valve V.

That is, in the battery cooling apparatus 20, the battery coolant line 21 connecting the second water pump 22, the battery module 24, and first coolant heater 26 is opened.

In the present state, the coolant is circulated along the battery coolant line 21 by the operation of the second water pump 22.

That is, the coolant passing through the chiller 30 is introduced into the fifth port P5 of the valve V, and then is discharged to the battery coolant line 21 connected to the second water pump 22 through the sixth port P6.

Herein, the first coolant heater 26 is operated to heat the coolant supplied to the battery module 24 along the open battery coolant line 21.

Accordingly, the coolant circulating in the battery coolant line 21 rises in temperature as it passes through the first coolant heater 26. Accordingly, the coolant having an increased temperature while passing through the first coolant heater 26 may be supplied to the battery module 24, to raise the temperature of the battery module 24.

As a result, according to various exemplary embodiments of the present invention, it is possible to rapidly increase the temperature of the battery module 24 while repeating the above-described process, efficiently managing the temperature of the battery module 24.

Thus, if the thermal management system for the vehicle according to various exemplary embodiments of the present invention as described above is applied, the temperature of the battery module 24 may be adjusted depending on the mode of the vehicle by use of one chiller 30 for performing heat exchange between the coolant and the refrigerant, and the interior of the vehicle may be heated by use of the coolant, simplifying the entire system.

According to various exemplary embodiments of the present invention, it is also possible to improve the heating efficiency by recovering waste heat from the electrical component 15 and using it for internal heating.

Furthermore, according to various exemplary embodiments of the present invention, it is possible to optimize the performance of the battery module 24 by efficiently controlling the temperature of the battery module 24, and increase an overall travel distance of the vehicle through efficient management of the battery module 24.

The present invention also improves the condensing or evaporation performance of the refrigerant by use of the condenser 53 and the sub-condenser 54, improving the cooling performance and reducing the power consumption of the compressor 59.

Furthermore, the entire system may be simplified to reduce manufacturing cost and weight, and to improve space utilization.

In various exemplary embodiments of the present invention, a controller is connected to at least one of the elements of the thermal management system, to control the operations thereof.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a controller, and the controller may be configured by a plurality of controllers, or an integrated single controller.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A thermal management system for a vehicle, the thermal management system comprising:
   a cooling apparatus including a radiator, a first pump, a valve, and a reservoir tank which are connected through a coolant line, and configured to circulate a coolant in the coolant line to cool at least one electrical component provided in the coolant line;
   a battery cooling apparatus including a battery coolant line connected to the coolant line through the valve, and a second pump and a battery module which are connected to the battery coolant line to circulate the coolant in the battery module;
   a chiller provided in the battery coolant line between the valve and the battery module, and connected to a refrigerant line of an air conditioner through a refrigerant connection line, to adjust a temperature of the coolant by performing heat exchange between the coolant which is circulated in the battery coolant line and a refrigerant which is selectively supplied from the air conditioner;
   a heater provided in the coolant line between the at least one electrical component and the radiator to heat a vehicle interior by use of the coolant supplied from the cooling apparatus;
   a branch line having a first end portion connected to the coolant line between the radiator and the heater, and a second end portion connected to the valve; and
   a chiller connection line connecting the chiller and the valve separately from the battery coolant line;
   wherein the reservoir tank is provided in the coolant line between the radiator and the valve, and is connected to the coolant line connecting the valve and the first pump through a supply line bypassing the valve, and
   wherein a condenser included in the air conditioner is connected to the coolant line to pass the coolant circulating through the cooling apparatus.

2. The thermal management system of claim 1, wherein the valve includes:

a first port connected to the coolant line connected to the reservoir tank;

a second port connected to the coolant line connected to the first pump;

a third port connected to the chiller connection line;

a fourth port connected to the branch line;

a fifth port connected to the battery coolant line connected to the chiller; and a sixth port connected to the battery coolant line connected to the second pump.

3. The thermal management system of claim 2, wherein the valve is configured to be operated to discharge the coolant through a port adjacent to another port into which coolant is introduced among the first port, the second port, the third port, the fourth port, the fifth port and the sixth port.

4. The thermal management system of claim 1, wherein the air conditioner includes:

a heating, ventilation, and air conditioning (HVAC) module including an evaporator which is connected to the refrigerant line and a door configured to control an outside air passing through the evaporator to be selectively introduced into the heater depending on a cooling mode, a heating mode, and a heating and dehumidification mode of the vehicle;

a condenser provided in the refrigerant line and in the coolant line between the radiator and the heater to circulate a coolant in the condenser to perform heat exchange between the coolant and a refrigerant supplied through the refrigerant line;

a compressor connected between the evaporator and the condenser through the refrigerant line;

a sub-condenser provided in the refrigerant line between the condenser and the evaporator;

a first expansion valve provided in the refrigerant line between the sub-condenser and the evaporator; and a second expansion valve provided in the refrigerant connection line.

5. The thermal management system of claim 4, wherein the second expansion valve expands the refrigerant introduced through the refrigerant connection line to flow the refrigerant to the chiller when cooling the battery module by the refrigerant.

6. The thermal management system of claim 4, wherein a first end portion of the refrigerant connection line is connected to the refrigerant line between the sub-condenser and the first expansion valve, and wherein a second end portion of the refrigerant connection line is connected to the refrigerant line between the evaporator and the compressor.

7. The thermal management system of claim 4, wherein each of the chiller and the condenser is a water-cooled heat exchanger, and the sub-condenser is an air-cooled heat exchanger.

8. The thermal management system of claim 4, wherein the HVAC module further includes an air heater provided at a side opposite to the evaporator with respect to the heater interposed between the air heater and the evaporator to selectively heat the outside air passing through the heater.

9. The thermal management system of claim 8, wherein the air heater is configured to be operated to raise a temperature of the outside air passing through the heater when a temperature of a coolant supplied to the heater is lower than a target temperature for internal heating.

10. The thermal management system of claim 4, wherein when the battery module is cooled in the cooling mode of the vehicle, in the cooling apparatus, the coolant is circulated in the coolant line by operation of the first pump, and the supply line is opened;

the branch line and the chiller connection line are closed through operation of the valve;

the coolant line and the battery coolant line form independent closed circuits through operation of the valve;

in the battery cooling apparatus, the coolant passing through the chiller is supplied to the battery module along the battery coolant line through operation of the second pump;

in the air conditioner, the refrigerant line connecting the sub-condenser and the evaporator is opened through operation of the first expansion valve;

the refrigerant connection line is opened through operation of the second expansion valve; and the first and second expansion valves expand a refrigerant supplied to the refrigerant line and the refrigerant connection line, respectively, and supply the expanded refrigerant to the evaporator and the chiller.

11. The thermal management system of claim 10, wherein the condenser condenses the refrigerant through heat exchange with the coolant, and the sub-condenser additionally condenses the refrigerant introduced from the condenser through heat exchange with the outside air.

12. The thermal management system of claim 1, wherein when cooling the at least one electrical component and the battery module by use of the coolant, the branch line is closed through operation of the valve;

the chiller connection line is opened through operation of the valve, and the supply line is opened;

a portion of the battery coolant line connecting the chiller and the first valve is closed through operation of the valve;

the coolant line connecting the reservoir tank and the valve is connected to the battery coolant line through operation of the valve;

the coolant cooled in the radiator passes through the battery module along the battery coolant line from the valve through operation of the first and second pumps; and the coolant passing through the battery module is introduced from the chiller to the valve along the opened chiller connection line, and then is supplied to the at least one electrical component while flowing along the coolant line connected to the first pump.

13. The thermal management system of claim 1, wherein when using waste heat of the at least one electrical component in a heating mode of the vehicle, the branch line and the chiller connection line are opened through operation of the valve;

in the cooling apparatus, on a basis of the branch line, the coolant line connected to the radiator, the reservoir tank, and the valve are closed;

the supply line is opened;

the battery coolant line except for the battery coolant line connected to the chiller is closed through operation of the valve;

the coolant having a temperature that has risen while passing through the at least one electrical component by operation of the first pump is supplied to the heater along the opened coolant line without passing through the radiator;

the coolant discharged from the heater is introduced into the valve along the opened coolant line and the opened branch line;

the coolant introduced into the valve is again introduced into the valve along the opened chiller connection line after passing through the chiller along the opened portion of the battery coolant line; and the coolant again introduced into the valve is supplied to the at least one electrical component along the opened the coolant line.

14. The thermal management system of claim 1, wherein when using waste heat of the at least one electrical component and cooling of the at least one electrical component is required, in a heating mode of the vehicle, the branch line and the chiller connection line are closed through operation of the valve;

in the cooling apparatus, the coolant line is opened;

the supply line is opened;

the battery cooling apparatus is deactivated;

the coolant having a temperature that has risen while passing through the at least one electrical component by operation of the first pump is supplied to the heater along the coolant line; and the coolant discharged from the heater is cooled while passing through the radiator along the coolant line through operation of the first pump, and then recovers waste heat from the at least one electrical component while passing through the at least one electrical component and cools the at least one electrical component at a same time.

15. The thermal management system of claim 1, wherein the valve is a six-way valve.

16. The thermal management system of claim 1, wherein the at least one electrical component includes a motor, or an electric power control unit (EPCU), or an inverter, or an autonomous driving controller, or an on board charger (OBC).

17. The thermal management system of claim 1, wherein the supply line is connected to the coolant line, when the coolant is circulated to the coolant line by operation of the first pump.

18. The thermal management system of claim 1, wherein the battery cooling apparatus further includes a first coolant heater provided in the battery coolant line between the battery module and the chiller.

19. The thermal management system of claim 18, wherein the first coolant heater is operated to heat the coolant supplied to the battery module along the battery coolant line, when the battery module is heated.

20. The thermal management system of claim 18, wherein when the battery module is heated, the battery coolant line is not connected to the coolant line by operation of the valve;

the branch line and the chiller connection line are closed by operation of the valve;

the coolant is circulated along the battery coolant line by operation of the second pump; and the first coolant heater is operated to heat a coolant supplied to the battery module along the battery coolant line.

* * * * *